April 1, 1930. M. B. JACKSON 1,752,597
VEGETATIVE DEVICE
Filed April 1, 1927
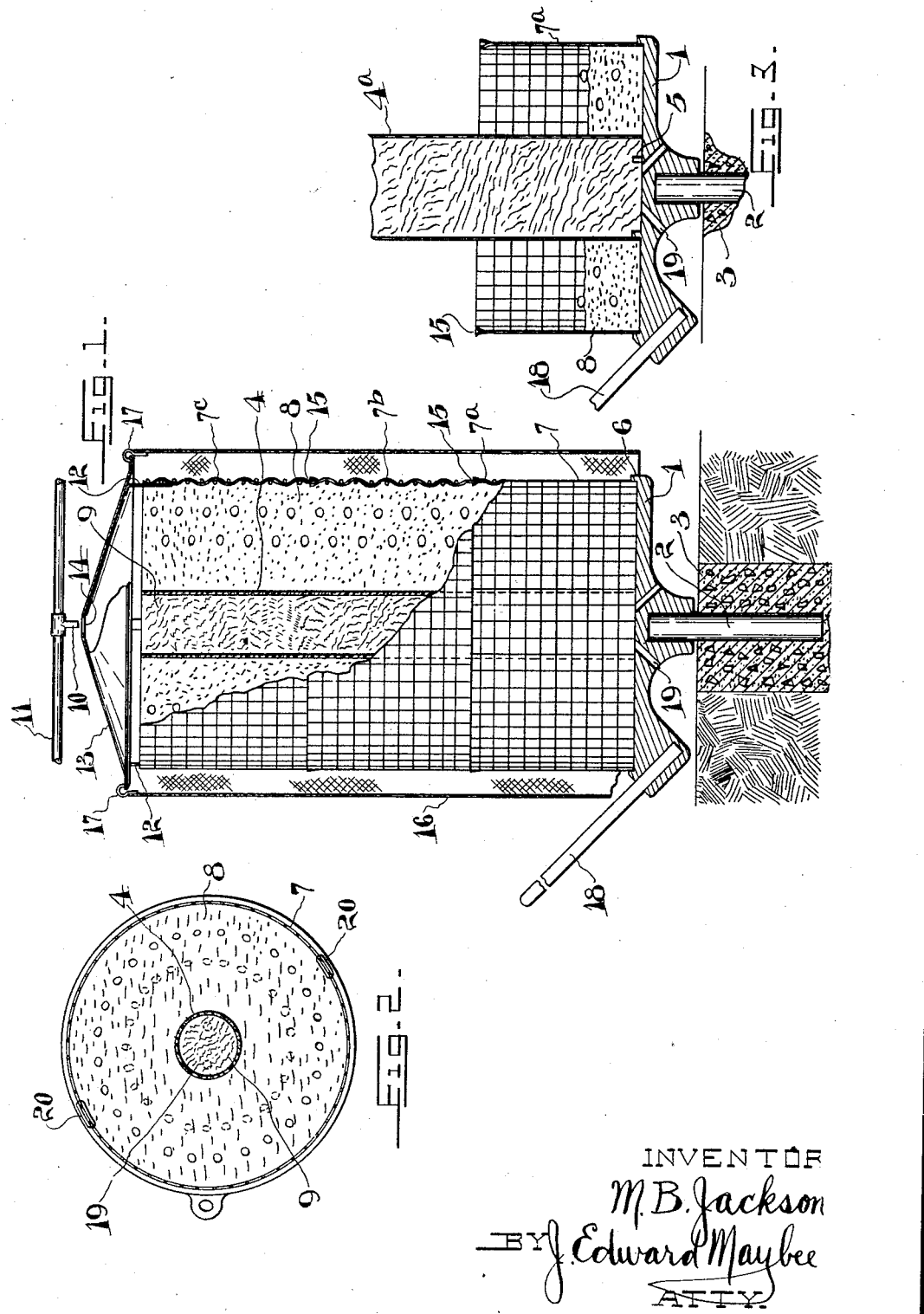

Patented Apr. 1, 1930

1,752,597

UNITED STATES PATENT OFFICE

MAUNSELL B. JACKSON, OF TORONTO, ONTARIO, CANADA

VEGETATIVE DEVICE

Application filed April 1, 1927. Serial No. 180,301.

This invention relates to vegetative devices for growing plants rapidly in a temperate climate, and my object is to so construct a device of such character that any desired portion of its periphery may be directed towards the sun, that the crop may be easily and readily planted and harvested, and that the soil and young plants may be protected from the weather elements. Other objects I have in mind will hereinafter appear.

I attain my objects by providing a porous core having a sectional perforated member surrounding the core in spaced relationship thereto. Soil is filled in between the core and the member and during this operation the vegetables are planted. In other words so much soil is filled in, then a row of vegetables is planted, and then another layer of soil is added and so on. The perforated sections of the member act as a retaining wall and as each section is filled in another section is added until the device is built up to the desired height. The device includes a rotatable support on which the other parts are carried so that the device may be rotated to present all portions of the soil to the sun. The constructions are hereinafter more fully described and illustrated in the accompanying drawings in which Fig. 1 is a vertical section, partly in elevation, of my device;

Fig. 2 a cross section of the same; and

Fig. 3 a sectional detail showing the method of planting.

In the drawings like numerals of reference indicate corresponding parts in the different figures.

1 is a support rotatably mounted on the upper end of a spindle 2 which may be supported in a base 3 of cement. On the support is carried a core 4 formed of porous material such as weeping tile or perforated metal. In Fig. 3 a reticulated cylinder $4^a$ is used as a core and the support 1 is provided with upwardly extending pins or projections 5 adapted to center the cylinder.

A perforated member 7 carried on the support is positioned thereon, by means of a rim 6, in spaced relationship and concentric to the core. The member 7 is preferably a reticulated cylinder formed in sections $7^a$, $7^b$, $7^c$ adapted to be carried one on top of the other to form a retaining wall for the soil 8 which is filled in the space between the core and the retaining wall.

The interior of the core is stuffed with moisture-absorbent material 9 such as weed stems and this material may be watered by a spout 10 connected with a water supply pipe 11. On the upper section $7^c$ is supported by means of legs 12 a conical top 13 having a centrally located hole 14 in alinement with the water spout 10.

Assuming the rotatable support 1 is mounted on its spindle 2, the crop is planted in the following manner. The core 4 and the lower section $7^a$ of the retaining wall are positioned on the support as shown in Fig. 3 and soil is filled in between the core and the retaining wall until its depth is sufficient to enable the first row to be planted. More soil is then added and the second row is planted and so on until the section $7^a$ is filled. The free ends of the wire netting at the upper end of each section are so directed that they form a V shaped pocket 15 adapted to receive the lower end of the adjacent section. The section $7^b$ is then fitted on the section $7^a$ and is planted in the same manner as the section $7^a$. The adjacent rows are preferably arranged in staggered relationship to one another to obtain the maximum number of plants in each device. The next step is to add the section $7^c$ to the section $7^b$ and the fresh section is planted in the same manner as the previous sections. The top 13 is then added and the engagement of the legs 12 with the inner periphery of the section $7^c$ ensures that the hole 14 will be in alinement with the spout 10 and the core 4.

The core may be filled with the moisture-absorbent material either before it is positioned on the support or just before the top cover 13 is added. The purpose of this core is to maintain the inner wall of the column of soil in a moist condition so that the roots of the vegetables planted in the soil will be drawn inwardly. The stems of the vegetables will pass through the perforations in the retaining wall 7.

To shield the outer wall of the soil from violent rain storms and to protect the young vines from frost I provide a side cover formed as a curtain 16 adapted to be removably and adjustably carried by means of hooks 17 on the top 13. The side curtain 16 is thus adapted to shield the young plants from the weather elements and may be partially withdrawn and the soil carrying means turned to expose some of the plants to the atmosphere while protecting the remainder of the plants from the weather elements.

The cover 13 is provided to protect the top of the soil 8 from the weather elements and thus prevents a rain storm from washing out the soil and shields the top of the soil from the sun which would cause the upper plants to grow in a different direction from that of the lower plants.

The support 1 is provided with a handle 18 whereby the device as a whole may be rotated so that any desired portion of the periphery of the soil may be directed towards the sun. Openings 19 are formed in the support below the moisture-absorbent material 9 to drain any excessive moisture therefrom.

The harvesting of the crop is easily and readily accomplished by removing the top 13 and emptying the soil and vegetables from the sections $7^c$, $7^b$ and $7^a$ in turn. As each section is emptied it is removed to facilitate the handling of the next section. Preferably the sections are formed of longitudinally separable parts adapted to be connected by any suitable fastening devices such as the links 20, whereby the sections may be knocked down for storage and transportation.

It will be distinctly understood that the term soil used in the claims includes anything in which the roots of plants will grow such as clear earth, fertilized earth or moss.

What I claim is:

1. A vegetative device including turnable means for carrying soil; a cover for protecting the top of the said coil and the plants from the weather elements; and a removable side cover adapted to shield the soil and the young plants from the weather elements.

2. A vegetative device including turnable means for carrying soil; a cover for protecting the top of the said soil from the weather elements; a removable side curtain adapted to shield the young plants from the weather elements, the said curtain being adjustably carried whereby it may be partially withdrawn and the soil carrying means turned to expose some of the plants to the atmosphere while protecting the remainder of the plants from the weather elements.

Signed at Toronto, Canada, this 24th day of March, 1927.

MAUNSELL B. JACKSON.